United States Patent [19]

Schröder et al.

[11] 3,778,549

[45] Dec. 11, 1973

[54] TRANSMISSION ARRANGEMENT

[75] Inventors: Jürgen Schröder; Günter Ochel; Hans-Joachim Von Hörsten, all of Bremen, Germany

[73] Assignee: U.S. Philips Corporation, New York, N.Y.

[22] Filed: Feb. 8, 1972

[21] Appl. No.: 224,565

[30] Foreign Application Priority Data

Feb. 13, 1971 Germany .................. P 21 06 835.9

[52] U.S. Cl. ................. 178/68, 340/172.5, 235/154

[51] Int. Cl. ............................................ H04l 15/00

[58] Field of Search ........................ 178/68; 340/168

[56] References Cited

UNITED STATES PATENTS

| | | | |
|---|---|---|---|
| 3,162,724 | 12/1964 | Ringelhaan | 178/68 |
| 3,369,229 | 2/1968 | Dorros | 178/68 |
| 3,688,036 | 8/1972 | Bland | 178/68 |

*Primary Examiner*—Maynard R. Wilbur
*Assistant Examiner*—Jeremiah Glassman
*Attorney*—Frank R. Trifari

[57] ABSTRACT

In a transmission system for connecting a computer selectively to various pieces of equipment through a transmission network using modulators-demodulator (modem) transmission, a clock-pulse generator is directly coupled to the transmitter of an internal modem so that the equipment selectively connected to the computer through an external modem and the internal modem is synchronized with the frequency of the clock pulse generator although delayed in phase therewith. The signals received from the equipment selectively connected to the computer by the receiver of the internal modem are alternately stored in two flip-flops of a coupling device under the control of a first two-phase clock signal derived from the signal received in the internal modem. The receiver of the external modem connected to the computer interrogates the storage flip-flops alternately with a second two-phase clock signal derived from the clock pulse generator connected to the external modem. Thus, storage of the received data under the control of the first two-phase clock pulse signal derived from the frequency of the data and subsequent interrogation of the stored information under the control of a second two-phase clock signal derived from the clock pulse generator used to transmit signals to the equipment producing the data signals synchronizes the phase of the received data signals with the phase of the transmitted information.

7 Claims, 5 Drawing Figures

TRANSMISSION ARRANGEMENT

The invention relates to a transmission arrangement for the transmission of data signals between a computer coupled to an external transmission network and an internal data transmission network having an internal modem which is coupled at one end to an external modem of said external transmission network and which may be coupled arbitrarily to one of a plurality of terminals of said internal transmission network at the other end. The computer-coupled modem of said external transmission network is provided with a clock pulse generator for the entire system.

In such transmission devices the data received in the internal modem exhibit a phase shift relative to the clock signal of the external modem. The amount of phase shift is dependent upon the terminal coupled to the internal modem because, since the distances between the internal modem and the respective terminals are mutually different there will be differences in delay time. The above-mentioned phase shift makes it necessary that the clock pulse generator in such transmission devices is resynchronized whenever there is a change-over from one terminal to the other.

It is an object of the present invention to provide a transmission arrangement of the kind described in the preamble in which the above-mentioned resynchronization of the clock pulse generator may be omitted while maintaining a satisfactory transmission quality.

According to the invention the transmission arrangement is characterized in that the clock signal received in said external modem is directly applied to the transmitter of said internal modem and is applied through a coupling device to the transmitter of said external modem. The coupling device includes two stores in which the data received from the internal transmission network are alternately stored under the control of a two-phase clock signal which is derived in said coupling device from the data signals received from said internal modem. The data signals thus doubled in length are alternately read out of the stores under the control of a two-phase clock signal derived from the clock signal applied to the coupling device and originating from said external modem. The two-phase clock signal is thus allotted to the two stores such that said stored data signals are alternately sampled in a region the limits of which are located at a distance equal to the clock pulse width relative to the nearest transitions of the relevant data signal.

Figure 1:
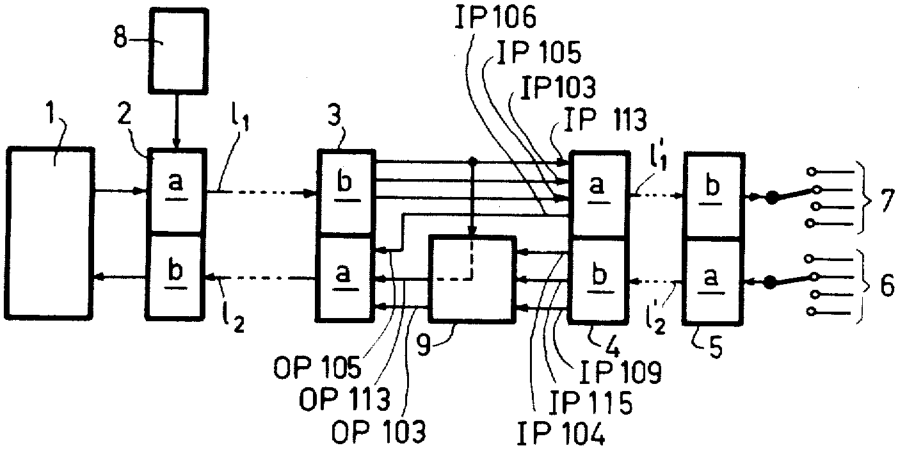
Figure 2:
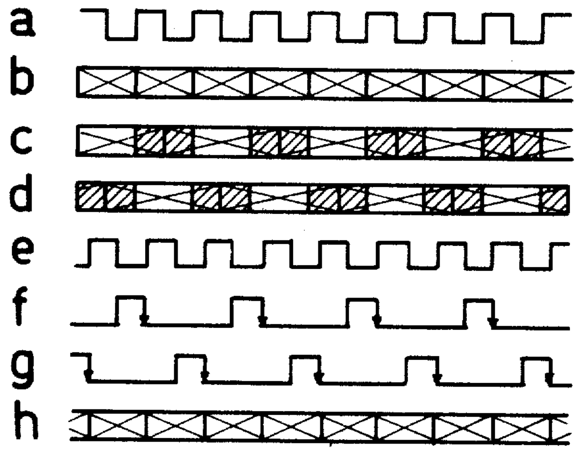
Figure 3:
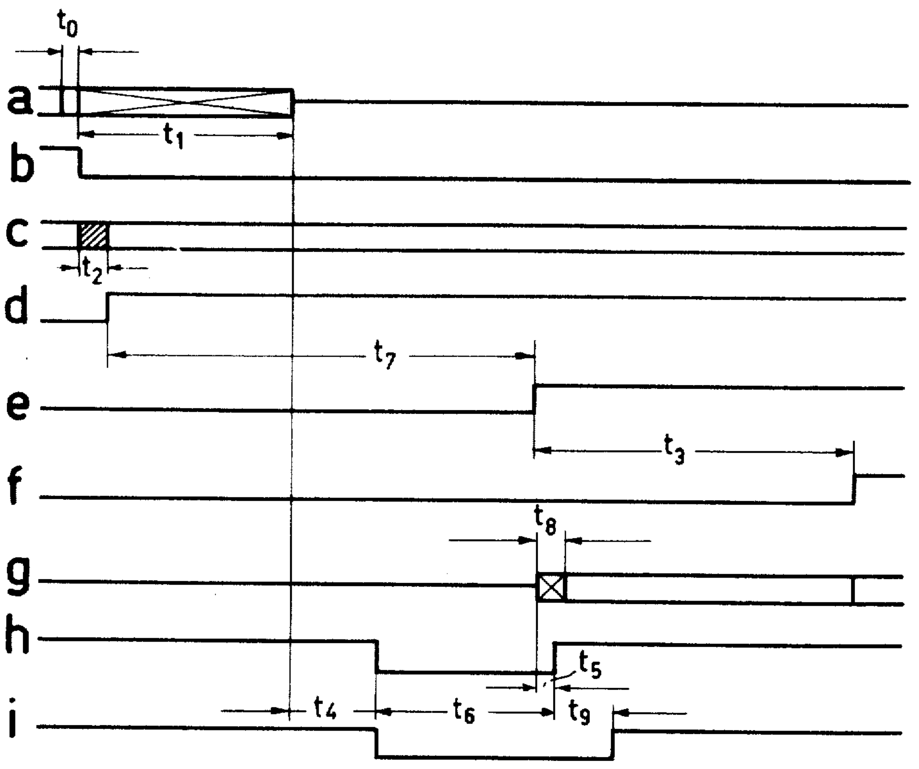
Figure 4:
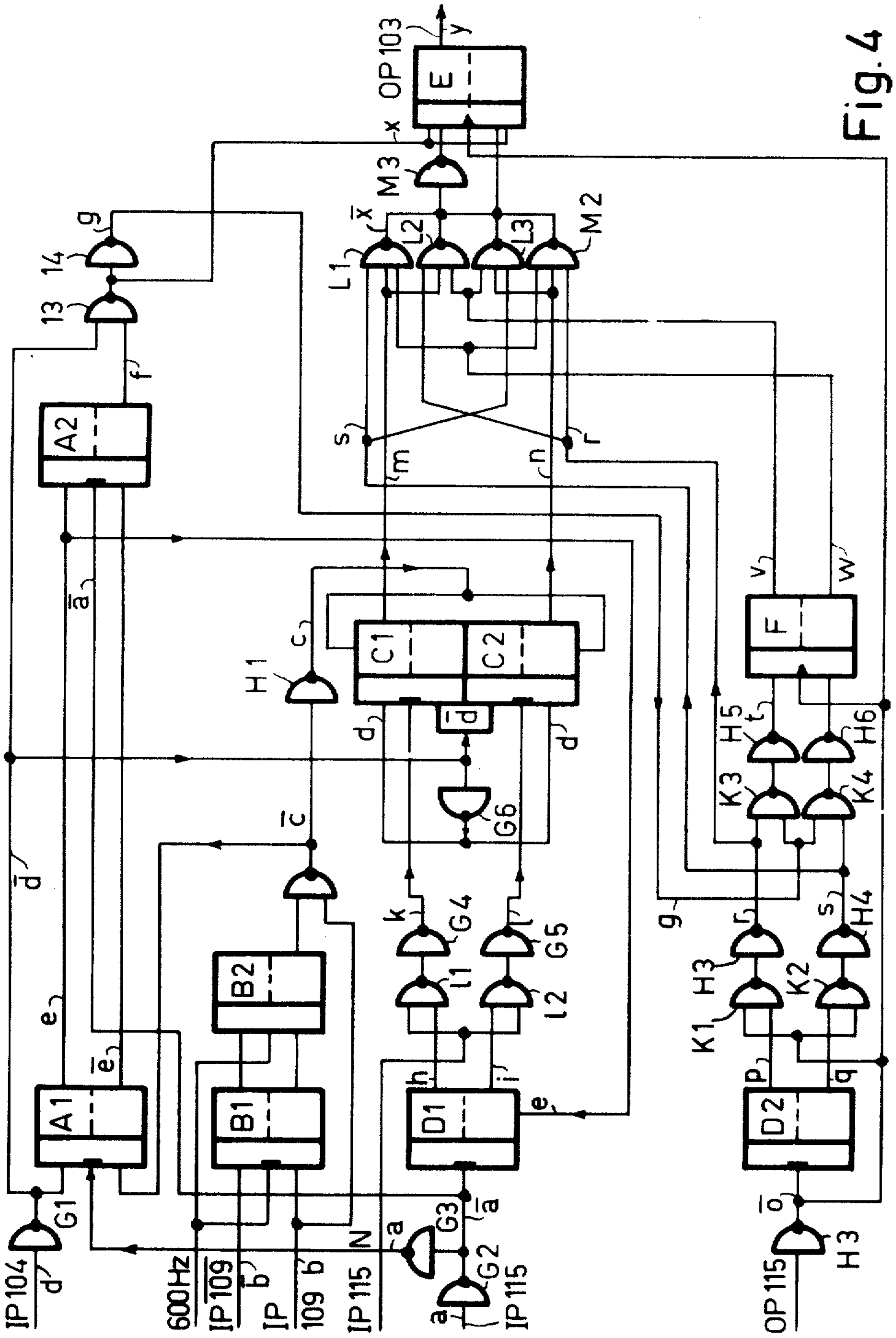
Figure 5:
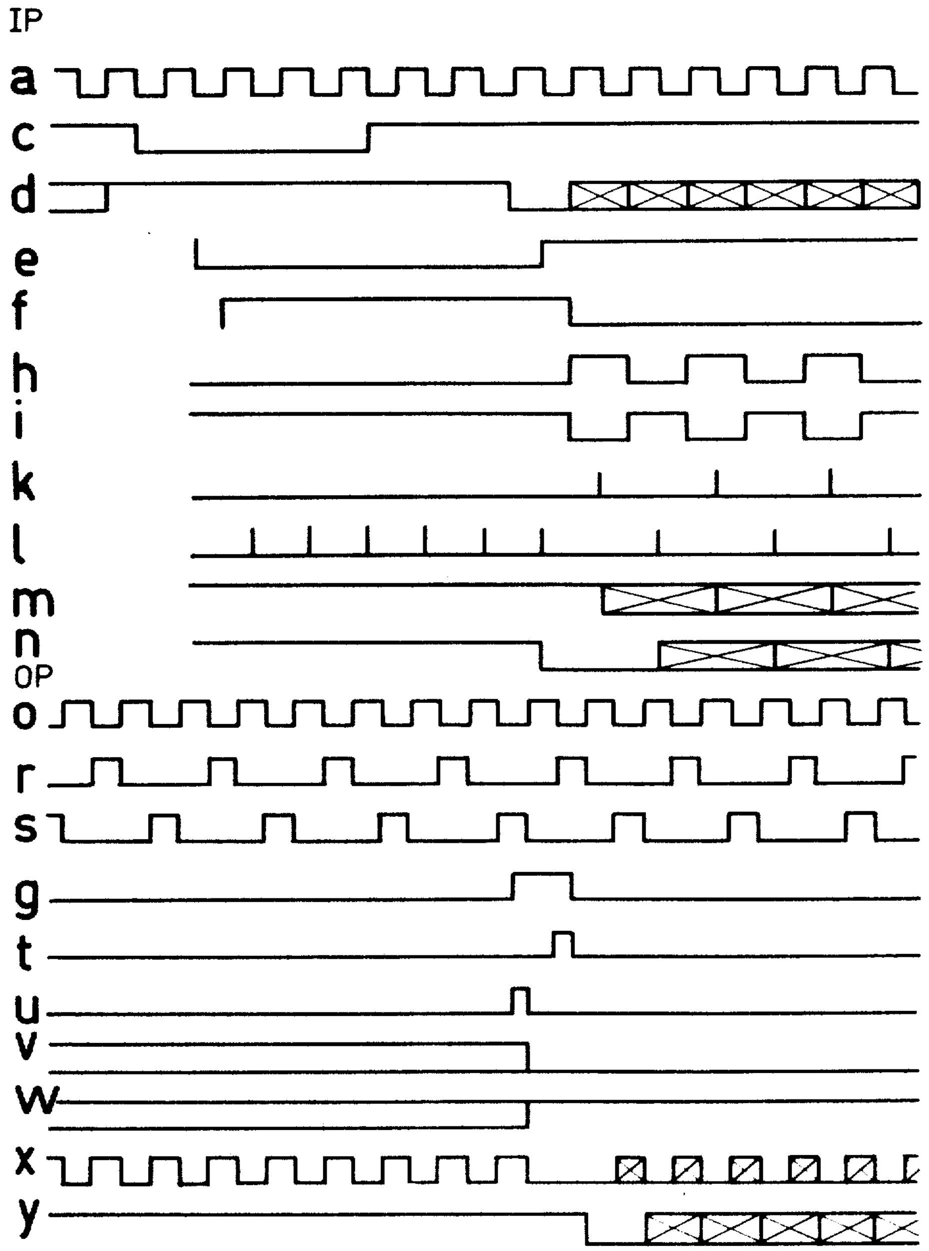

In order that the invention may be readily carried into effect, some embodiments thereof will now be described in detail by way of example with reference to the accompanying diagrammatic drawings in which FIG. 1 shows the structure of a transmission arrangement according to the invention in a block schematic diagram FIGS. 2, 3 and 5 show time diagrams to explain the operation of the transmission arrangement according to the invention and FIG. 4 shows an embodiment of the coupling device used in the transmission arrangement according to FIG. 1.

In the transmission arrangement shown in FIG. 1 reference numeral 1 denotes a computer which can be connected to any of the transmitter and receiver terminals denoted at 6 and 7 of an internal data transmission network II through an external point-to-point transmission network I including external modems 2 and 3 connected by leads $1_1$ and $1_2$ and said internal data transmission network II including internal modem 4 and 5 connected by leads $1'_1$ and $1'_2$. As is common practice each of the said modems 2, 3, 4 and 5 has a transmitter section *a* and a receiver section *b*. The modem 2 connected to computer 1 is provided with a clock pulse generator 8 which serves for synchronization of the entire system.

In accordance with the invention a particularly favorable and advantageous transmission device is obtained if the clock signal received in said external modem 3 is directly applied to the transmitter of said internal modem 4 and through a coupling device 9 to the transmitter of said external modem 3. The Coupling device 9 comprises two stores in which the data received from the internal transmission network II are alternately stored under the control of a two-phase clock signal which is derived in this coupling device 9 from the data signals received from the internal modem 4. These data signals thus doubled in length are alternately read out of said stores under the control of a two-phase clock signal which is derived from the clock signal from said external modem e. The two phase clock signal derived from the external modem 3 is alloted to the two stores in such a manner that said stored data signals are alternately sampled in a region whose limits are located at a distance equal to the clock pulse width relative to the nearest transitions of the relevant data signal.

The clock signal OP 115 (see FIG. 2*c*) received in the external modem 3 is applied to the transmitter of the external modem 3 and to the transmitter of the internal modem 4 (OP 113 and IP 113). As a result the external transmission network I remains continuously in the synchronized state.

The clock signal IP 115 (FIG. 2*a*) from the internal modem 4 is derived from the received data and the data transmitted by this modem are synchronized with the same clock pulses (slave principle). In order that synchronization is maintained when the transmission of data is temporarily interrupted (no transmission of synchronizing signals either) the internal modem 4 transmits the low characteristic frequency (= logical 1) during the transmission pauses, from which frequency the internal modems 4 and 5 can derive the clock pulses.

Due to the phase variations caused by synchronization the data signal IP 104 (see FIG. 2*b*) must not be sampled in the vicinity of the signal transitions as might occur, for example, when using a single reception flip-flop as a matching element. The data are therefore alternately stored in two stores with the aid of a two-phase clock signal obtained from the clock signal IP 115 (see FIG. 2*a*). The two-phase clock signals OPT1 and OPT2 (FIGS. 2*f* and *g*) is also derived from the clock signal OP 115. A control circuit to be described hereinafter and a subsequent change-over switch applies the two clock signals and to the stores in such a manner that they are sampled in the region shown in FIGS. 2*c* and 2*d* by the non-hatched area whose limits are located at a distance equal to the clock pulse width relative to the nearest transitions of the relevant data signal. The stores C1 and C2 of FIG. 4 must not be sampled in the hatched area so that with this coincidental phase location the relation applies OPT1 → store C2
OPT2 → store C1

After a new terminal of the internal transmission network II is called from the computer the coupling device 9 is brought to a preparatory condition which renders it possible to lock the arrangement on the data transmitted to the called terminal. The modem coupling device 9 comes in its preparatory condition when the signal IP 109 (reception signal level) of the receiver of the internal modem 4 at the modem coupling device produces a logical 0, indicating that the reception signal level lies below the threshold of level supervision. Locking is effected with the first logical 0 occurring on the data lead IP 104 after the signal IP 109 again produces a logical 1.

As the coupling device 9 is thus controlled by the signal IP 109, steps are taken which insure that this signal IP 109 drops to produce a logical 0 when changing over from one terminal to the other. This is achieved in that the transmitter of the internal modem 5, is switched on by the signal 2/IP 105'), which signal relative to the signal 2/IP 105 (transmitter section of the internal modem 4 to be switched on) is delayed over a given period $t$. In FIG. 3 this delay $t_7$ upon changing-over to another terminal is illustrated (undelayed: 2/IP 105, delayed: 2/IP 105'). The total delay period $t_v$ which is required is internally adjusted in the internal modem 5 and may be calculated from:

- $t_1$ duration of the transient phenomena on the line
- $t_2$ length of the address for calling a terminal
- $t_3$ delay time of the signal "transmission stand-by" (2/IP 106) relative to the signal "delayed switching-on of transmitter" (2/IP 105')
- $t_4$ decay time of level supervision signal (IP 109)
- $t_5$ response time of level supervision (IP 109)
- $t_6$ duration of the decayed condition of signal IP 109 (reception level supervision of the internal modem 4)
- $t_8$ duration of the transient phenomena on the line
- $t_9$ response delay of the signal (IP 109').

FIG. 3 shows the signal on line $1'_2$ when the internal modem 5 connected to a given terminal discontinues the transmission of data. The signals IP 105, IP 105' and Ip 106 consequently drop off substantially simultaneously which is illustrated by the signal shown in FIG. 3*b*. As FIG. 3*a* shows, the low characteristic frequency is transmitted through line $1'_2$ after termination of the transmission of data during a short period $t_0$ whereafter the transient phenomena occur during a period $t_1$.

For calling a new terminal, the transmission of the old address is interrupted by the computer through line $l_1$ so as to be replaced after a period $t_2$ by the new address (FIG. 3*c*). The shortest transmission period of the modem of the computer is $t = 1.67$ ms at a synchronous transmission employing 9,600 bits/s when there is no extra information transmitted (= 2 characters).

After termination of the address transmission, the called terminal applies the signal IP 105 (FIG. 3*d*) to the connected modem. The case which is most unfavorable relative to dropping off of the reception level signal Ip 109 occurs when the address is recognized without delay by the internal modem 5 and when this modem can consequently supply the signal IP 105 immediately (FIG. 3*d*). Thus a possible delay time occurring need not be taken into account in this case.

For the receiver section of the terminal the synchronization period and the response period for the level supervision (IP 109) are of no consequence because the transmitter of the external modem 2 of the computer produces the lower characteristic frequency or the frequency changes in accordance with possibly transmitted synchronizing characters in the transmission pauses so as to maintain synchronizm (this applies to each terminal in the system).

After a time delay $t_7$ the transmitter of the internal modem 5 is switched on by the signal 2 IP 105 shown in FIG. 3*c* and subsequently, after a period of time $t_3$, the transmitter of the internal modem 4 by transmitting the transmitter-stand-by signal IP 105 of FIG. 3*f* notifies the transmitter of external modem 3 that the transmitter of internal modem 4 is ready to transmit. As FIG. 3*g* shows the called terminal starts to transmit the lower characteristic frequency as soon as the transmitter of the internal modem 5 is switched on by the signal IP 105'. Transient phenomena then occur during the period $t_8$. After "transmitter stand-by" (IP 106) the transmission of data through line $l_2$ commences.

FIGS. 3*h* shows the variation of the signal IP 109 applied by the internal modem 5 to the coupling device 9 (reception signal level).

As already mentioned the coupling device 9 effects locking on receipt of the first logical zero of the demodulated transmitter signal following the logic value one as presented by the level supervision signal IP 109. A logical zero may be simulated by a transient phenomenon on the line. This transient phenomenon may last for a maximum of 2 ms ($t_8$ in FIG. 3*g*) but the level supervision signal IP 109 may already be representing the logic value one after 1,6 ms ($t_5$ in FIG. 3*h*). The signal IP 109 therefore has to be delayed. A delay period $t_9$ of 3.3 ms was chosen as is shown by signal IP 109' illustrated in FIG. 3*i*. In FIG. 3 the delay caused by the line was not taken into account (system using short lines) because a limited delay period has no influence or a favorable influence on the dropping off of the level supervision signal in the modem of the computer. FIG. 3 shows the critical case, where the time $t_6$ during which the signal IP 109 has dropped off is at a minimum.

The value chosen as a delay period between the signals IP 105 and IP 105' has so much clearance relative to the minimum required value that the address length $t_2$ may alternatively be shorter than 1.67 ms and in the extreme may be zero.

The required response delay of the signal IP 109 is effected with the aid of a shift register (FIG. 4) constituted by bistable trigger circuits B1 and B2, which register is controlled by a fixed shift frequency of 600 Hz so that a delay period of 3.3 ms occurs (signal *c* FIG. 5).

Signal *e* is produced by combination of the data signal with the signal *c* (delayed signal IP 109'). This signal serves to fix the two-phase clock pulse *k*, *l* in such a manner that the logical zero following the calling of a new terminal is stored in the store C2. When the signal $\bar{c}$ is located at the logical zero (IP 109 dropped off) and a new terminal is called, it first of all transmits the low modulation frequency corresponding to the logical 1 for approximately 22ms (duration between the signals IP 105 and IP 106). Up to the instant of response of the level detector (signal IP 109) at least 1.7 ms elapses in addition to the above-mentioned delay in the modem coupling device (signal *c*). Thus after switching on a different terminal a condition arises where the data signal indicates a logical 1 and the signal *c* (delayed signal IP 109') indicates a logical 0.

The signal *e* which occurs at the output of the flipflop A1 switched by the clock signal through inverter G3 is then indicated as a logical 0. When the signal *c* indicates a logical 1 after a maximum of 9,3 ms (maximum response time of the level detector +3.3ms) after the appearance of the transmission level, logical ones are still transmitted from the terminal (for approximately a total of 22 ms). The flipflop $\bar{A}1$ whose preparatory inputs convey the signals $\bar{d}$ and $\bar{c}$ does not change its state until the data signal assumes the value of the logical 0 for the first time. The signal *e* then changes to the value of a logical 1 and remains at this value as long as the signal *c* maintains the value of the logical 1 because the input 4 of A1 then conveys a logical 0 and the input 5 conveys a logical 11 or 0 and consequently the flip-flop A1 maintains its state (both inputs 0) or changes over in such a manner that the signal *e* becomes a logical 1 (input 4 $\triangleq$ 0, input 5 $\triangleq$ 1) which, however, as already mentioned above, is effected after the first logical 0 on the data signal.

As long as the signal *e* has the value of the logical 0 flipflop D1 to which the internal clock signal IP 115 is applied through an inverter stage G2 (FIG. 4) is maintained through the reset input. A logical 0 then appears at the output *k* of the gating circuit I1, G4 while the output l varies with the clock pulses. The signal *e* then changes its state exactly in the middle of the first zero bit so that this zero bit comes in the store C2. A two-phase clock pulse then appears at *k* and *l* which clock pulse stores the information alternately in the two stores C1 and C2 (signals *m* and *n*). For generating the two-phase clock signal needle pulses IP 115 N are used whose negative going transitions coincide with the trailing edges of the clock pulse IP 115. Before this the two stores are reset by the logical 0 of signal *c*. The stores are also connected through the gating circuit G6 to the outputs of an inverter stage G1.

A two-phase clock pulse *r, s* is generated from the external clock pulse OP 115 by the circuit consisting of the elements H2, D2, K1, K2, H3, H4. The clock pulses *r* and *s* must be applied to the stores C1 and C2 (signals *m* and *n*) in such a manner that their trailing edges sample the stores in a region the limits of which are located at a distance equal to the clock pulse width relative to the nearest transitions of the data signal. The first zero bit after calling a new terminal is located exactly in an area where the store C1 (signal *m*) is to be sampled. Thus a clock signal allotment can be obtained in that a pulse (*g*) is generated which only occurs during the first zero bit and has exactly the same length. While investigating which one of the trailing edges of the clock pulses *r* and *s* is in the region of the pulse *g*, the two-phase clock signal *r, s* can be applied to the stores C1 and C2.

The pulse G is produced by combination of the data signal with the signal *e* delayed over half a bit interval by the delay flipflop A2 (signal *f*) by means of the gating circuits I3, I4. When the signal *f* indicates a logical 1(up to the end of the first zero bit) and the information signal has a logical 0, a logical 1 appears at the lead *g*. During this period the gating circuits K3 and K4 are enabled and the two-phase clock signal *r* and *s* may be applied through H5, H6 to the inputs of the flipflop F arranged with the inverted external clock pulse. The flipflop F is switched to the condition where the trailing edge of the two-phase clock signal coincides at the input with the negative going transition of the inverted external clock pulse. The flipflop circuit maintains this condition as long as the relevant terminal transmits.

The change-over switch L1, L2, L3, M2 is controlled from the flipflop circuit F (signals *v* and *w*). As a result the two-phase clock signal is applied to the outputs of the stores C1 and C2 so that the data signal related with the clock pulse appears at the output of flipflop circuit E (signal *y*).

The clock signal IP 115 (FIG. 3*a*) is shown by way of example in FIG. 3 in such a phase relationship with respect to the clock signal OP 115 (FIG. 3*e*) that the derived clock signal S (FIG. 3*g*) is to sample the data stored in store C1 and the clock signal *r* (FIG. 3*f*) is to sample the data stored in store C2. Consequently, the output *w* of the flipflop circuit F of FIG. 4 has a logical 1 and the output *v* has a logical 0. As a result the gating circuits L1 and M2 are enabled so that their outputs convey the associated signals *s* and *m*, and *r* and *n*, respectively.

What is claimed is:

1. A transmission arrangement for the transmission of data signals between a computer coupled to an external point-to-point transmission network and an internal data transmission network, comprising a first external modem; an internal modem coupled at one end to the first external modem; means connecting the external modem to said point-to-point connection means coupling the other end of the internal modem selectively to one of a plurality of terminals of said internal data transmission network, a clock pulse generator connected to the first external modem coupled to the computer in said point-to-point connection at the transmitter end; means coupling the clock signal received in said external modem directly to the transmitter of said internal modem; a coupling device connecting the clock signal to the transmitter of said external modem, said coupling device comprising two stores, means in said coupling device for deriving a first two-phase clock signal from the data signals received from the internal modem, means for alternately storing the data received from the internal transmission network in the two stores under the control of the first two-phase clock signal, means for deriving a second two-phase clock signal from the clock signal from said external modem, said data signals thus doubled in length being alternately read out of the said stores under the control of the second two-phase clock signal which is allotted to the two stores in such a manner that said stored data signals are sampled in a temporal region whose limits are located at a distance equal to the clock pulse width relative to the nearest transitions of the relevant data signal.

2. A transmission arrangement as claimed in claim 1, wherein said coupling device comprises a gating circuit connected to a common reset input of the two stores, a delay circuit, means for applying a signal derived from the reception signal level of the receiver of said internal modem to the gating circuit directly and through the delay circuit.

3. A transmission arrangement as claimed in claim 2, wherein said delay circuit is constituted by a shift register controlled at a fixed shift frequency and wherein said stores each consist of a bistable trigger circuit.

4. A transmission arrangement as claimed in claim 1, wherein for taking up the external clock signal and the internal clock signal a bistable trigger circuit and subsequent gating circuits are provided and that the storing means are connected to the gating circuit following the bistable trigger circuit, a bistable trigger circuit, a change-over switch, means connecting the outputs of the stores to the change-over switch consisting of gating circuits, means connecting the change-over switch to the outputs of the bistable trigger circuit, means connecting the bistable trigger circuit to the outputs of the other gating circuit.

5. A transmission arrangement as claimed in claim 1, wherein a delay stage is arranged behind a bistable trigger circuit taking up the transmission information and being controlled by the internal clock pulse, the output of the delay stage being connected to the gating circuit behind the bistable input trigger circuit for the external clock pulse.

6. A transmission arrangement as claimed in claim 4, wherein the change-over switch consists of a gating circuit whose output is connected to a bistable trigger circuit arranged for the external clock pulse.

7. A transmission arrangement as claimed in claim 1, wherein the switch-on signal of the transmitter of a terminal modem is delayed relative to the switch-on signal of the transmitter of the internal modem.

* * * * *

PO-1050
(5/69)

UNITED STATES PATENT OFFICE
CERTIFICATE OF CORRECTION

Patent No. 3,778,549 Dated December 11, 1973

Inventor(s) JURGEN SCHRODER ET AL

It is certified that error appears in the above-identified patent and that said Letters Patent are hereby corrected as shown below:

IN THE SPECIFICATION

Col. 2, line 23, "e" should be --3--;

line 56, after "signals" cancel "and"

Col. 4, line 50, "c" should be --$\bar{c}$--;

line 54, "$\bar{c}$" should be --c--;

Signed and sealed this 23rd day of April 1974.

(SEAL)
Attest:

EDWARD M.FLETCHER,JR.
Attesting Officer

C. MARSHALL DANN
Commissioner of Patents